Jan. 19, 1965     W. D. VOELKER     3,166,454
METHOD FOR PRODUCING CORRUGATED POLYURETHANE FOAM PANELS
Filed Jan. 15, 1962
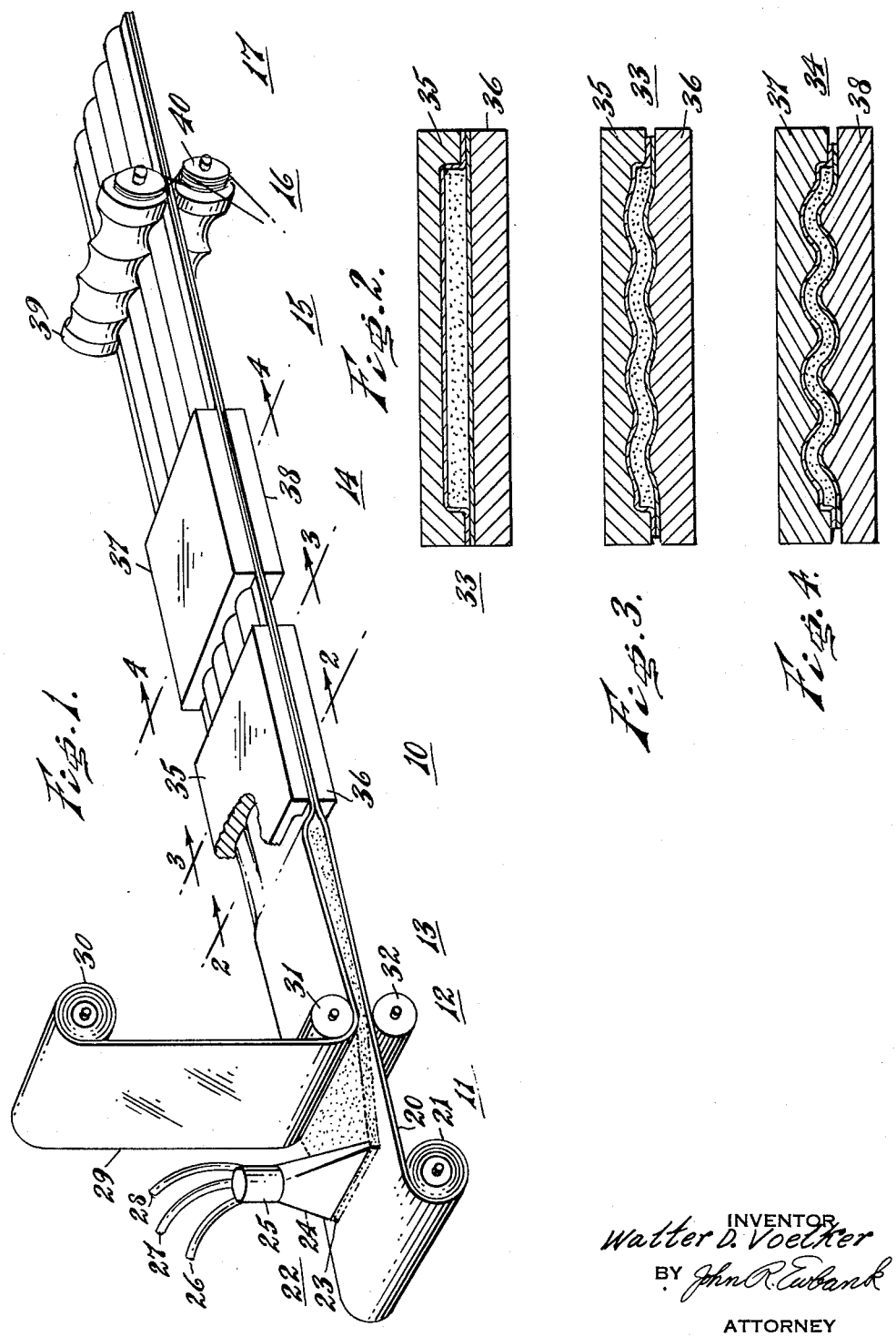
INVENTOR
Walter D. Voelker
BY John R. Eubank
ATTORNEY

3,166,454
METHOD FOR PRODUCING CORRUGATED POLYURETHANE FOAM PANELS

Walter D. Voelker, Philadelphia, Pa., assignor to Union Carbide Corporation, New York, N.Y., a corporation of New York
Filed Jan. 15, 1962, Ser. No. 166,101
2 Claims. (Cl. 156—78)

This invention relates to corrugated panels of plastic foam, and particularly to methods and apparatus for imparting the corrugated shape to the panel without bringing about adverse differences in the thickness of the panel.

Heretofore plastic foam has been employed in building construction. Corrugated plastic panels have also found a growing market. Notwithstanding the demand for a corrugated plastic foam panel having the structural strength of a corrugated panel and the insulating properties of plastic foam, such products have not been readily available, partly because of the difficulty of manufacturing such a product.

In accordance with the present invention, a panel characterized as a corrugated foam plastic panel is prepared by: depositing a plastic froth onto an advancing sheet; regulating the thickness of the deposit to provide a rectangular cross section, bringing about a partial cure of the advancing plastic froth so that it develops significant tensile strength, narrowing the width of the advancing plastic froth by shaping longitudinal corrugations therein, further curing the longitudinally corrugated advancing strip, and advancing the strip of cured corrugated plastic foam to a product removal zone, from which panels of corrugated plastic foam are removed.

The invention is further clarified by reference to the accompanying drawings. FIG. 1 is a schematic representation of the method of the present invention when accomplished by the use of appropriate apparatus. FIG. 2 is a sectional view taken at lines 2—2 of FIG. 1. Similarly, FIGS. 3 and 4 show sectional views taken on lines 3—3 and 4—4 respectively.

A panel-making machine 10 provides a coating zone 11, preliminary metering zone 12, preliminary curing zone 13, shaping zone 14, stabilizing zone 15, driving zone 16, and product removal zone 17.

A lower sheet 20 advances from a supply roll 21 and underneath an applicator 22, which deposits plastic froth 23 onto the advancing sheet at a rate which may be automatically controlled to maintain a predetermined thickness. The applicator 22 may comprise a nozzle 24 in which the froth develops the desired characteristics after passing through a restricted outlet from a high pressure plenum chamber 25. One or more components for the plastic froth may be supplied to the chamber 25 by at least one of conduits 26, 27, and 28. One of the components is a high pressure gas adapted to dissolve in the precursor and to bring about the froth formation when the mixture is transferred from a high pressure zone to an atmospheric zone, which gas may be any of those conventionally employed in froth plastic manufacture, such as difluorodichloromethane. An upper sheet material 29 advances from a supply roll 30 and onto the top surface of the froth 23. The upper sheet material 29 may pass around a roller 31 maintained at a regulated distance from a roller 32 so that the rolls serve as a thickness controlling means in the preliminary metering zone 12. The strip of sandwich structure comprising upper and lower sheets 20 and 29 and the plastic froth core 23 advances from the metering rolls 31, 32 through the preliminary curing zone 13 in which the plastic froth develops a tensile strength of at least 5% of the tensile strength of the panels to be manufactured. If the plastic froth comprises a mixture of organic diisocyanates and organic polyols which are undergoing reaction as the advancing sandwich advances through the preliminary curing zone, the thickness of the plastic froth may increase in a predetermined manner while the froth develops greater strength. The preliminarily cured sandwich strip advances into the shaping zone 14.

One or more shaping dies 33, 34, may be employed to shape the sandwich from a relatively wide rectangular cross-section to a relatively narrower but corrugated cross-section. The shaping die 33 includes upper and lower plates 35, 36. Similarly, the shaping die 34 includes upper and lower plates, 37, 38. Because the plastic froth has been given a preliminary cure, it has sufficient tensile strength to retain the froth structure while being subjected to shaping forces in moving through the dies. Because the shaping forces are generally transverse to the axis of the advancing strip of sandwich, tendencies toward the concentration of the froth in certain portions of the corrugations, and tendencies toward variations in the thickness of the sandwich are minimized. Moreover, a tension can be applied to the advancing strip having longitudinal corrugations, but tension cannot be applied to a laterally corrugated advancing strip without endangering the uniformity of the corrugations.

As shown in FIG. 2, the advancing strip of sandwich has a rectangular cross-section as it enters the shaping die 33. The upper sheet 29 may be slightly wider than the lower sheet 20 to permit the foldover shown in FIG. 2. The die 33 brings about the initial shaping toward a conventional corrugated shape, so that the developing pattern can be recognized when the sandwich has advanced as far as indicated in FIG. 3. The die 34 completes the shaping of the corrugated sandwich advancing toward the stabilizing zone 15. As indicated in FIG. 4, the die 34 shapes the advancing sheet sandwich so that it achieves a conventional corrugated shape. The advancing strip passes through the stabilizing zone 15 in which the polymerization reactions and other transformations increase the tensile strength of the plastic foam core 23 sufficiently that tension may be safely and reliably applied thereto. The thus stabilized strip passes between corrugated rollers 39, 40 of the driving zone 16, whereby the strip is advanced into the product removal zone 17.

Particular attention is directed to the fact that the corrugations are parallel to the direction of the advancing strip instead of transverse thereto, and to the fact that the plastic foam is derived from plastic froth. Various modifications of the method and/or apparatus can be made without departing from the scope of the appended claim.

The invention claimed is:
1. A method for continuous production of a corrugated panel comprising a pair of facing sheets and interposed polyurethane foam layer, which comprises the steps of:

advancing a pair of facing sheets from a feed position into a coating zone;

preparing a froth of a liquid phase foam-forming composition comprising a polyol and an organic polyisocyanate by dissolving a compressed gas in said liquid phase composition and subsequently permitting said gas to expand;

applying a layer of said froth of predetermined thickness between said advancing facing sheets in said coating zone to form a sandwich structure;

partially curing said sandwich structure to develop appreciable tensile strength through partial reaction of the components thereof;

passing said sandwich structure continuously through shaping dies to form a continuously longitudinally corrugated structure, said corrugated structure subsequently retaining the corrugated configuration as a result of the tensile strength developed by said partial curing;

fully curing said corrugated structure to complete reaction between the components thereof so as to form a corrugated panel comprising a pair of facing sheets and interposed layer of cured polyurethane foam; and removing the advancing corrugated panel in a product removal zone.

2. The method of claim 1 further comprising the step of passing the sandwich structure through spaced rollers prior to the partial curing to control the thickness thereof.

References Cited in the file of this patent

UNITED STATES PATENTS

| | | |
|---|---|---|
| 1,550,084 | Lorenz | Aug. 18, 1925 |
| 2,446,644 | Fischer | Aug. 10, 1948 |
| 2,998,501 | Edberg | Aug. 29, 1951 |
| 2,872,965 | Sisson | Feb. 10, 1959 |
| 2,950,221 | Bauer | Aug. 23, 1960 |
| 2,956,310 | Roop et al. | Oct. 18, 1960 |
| 3,034,996 | Kaplan | May 15, 1962 |
| 3,072,582 | Frost | Jan. 8, 1963 |
| 3,080,329 | Barringer | Mar. 5, 1963 |